Aug. 18, 1936.   C. W. DAKE   2,051,783
VARIABLE SPEED POWER TRANSMITTING MECHANISM
Filed Aug. 16, 1934   7 Sheets-Sheet 4
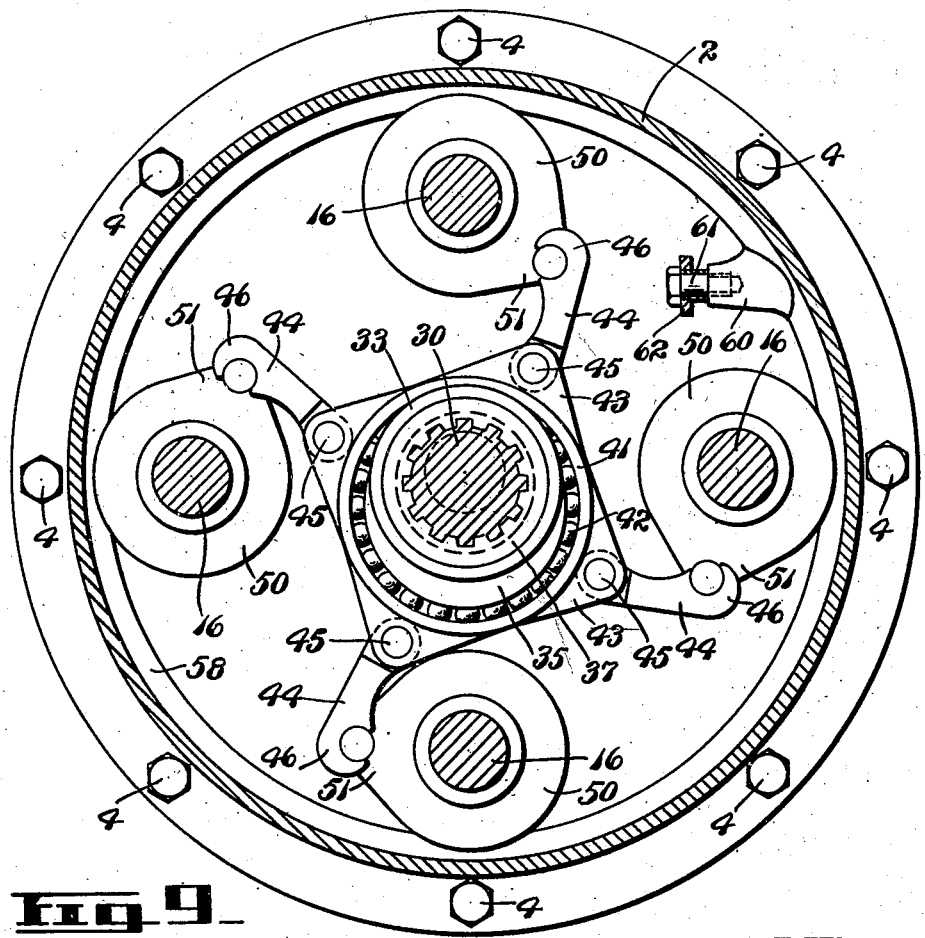
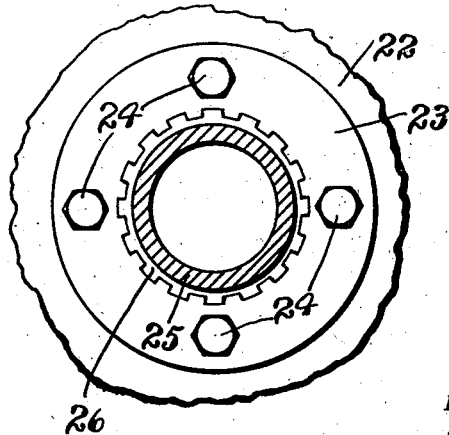
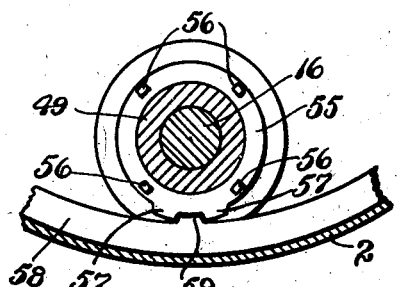
INVENTOR
Charles W. Dake
BY Liverance & Van Antwerp
ATTORNEYS

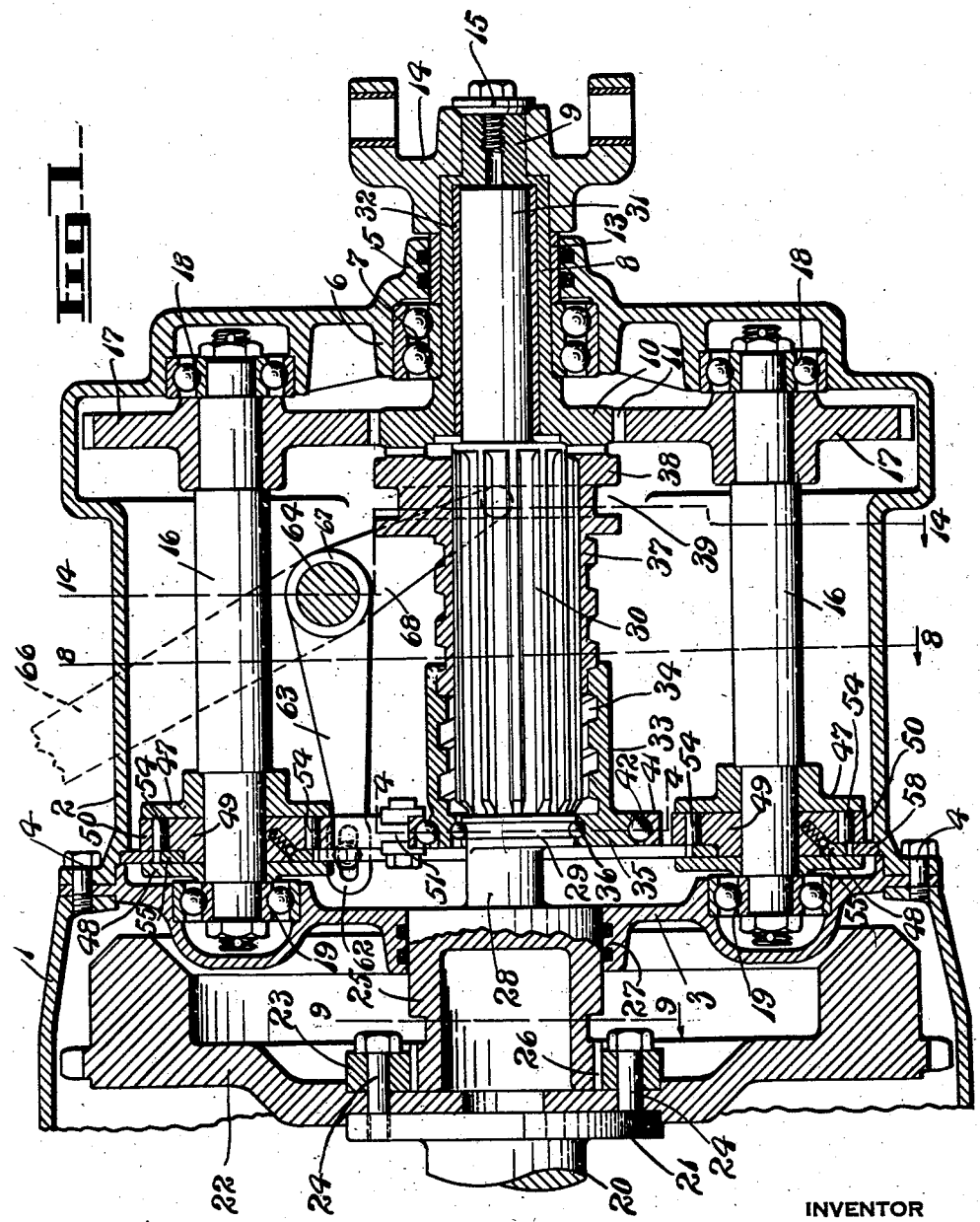

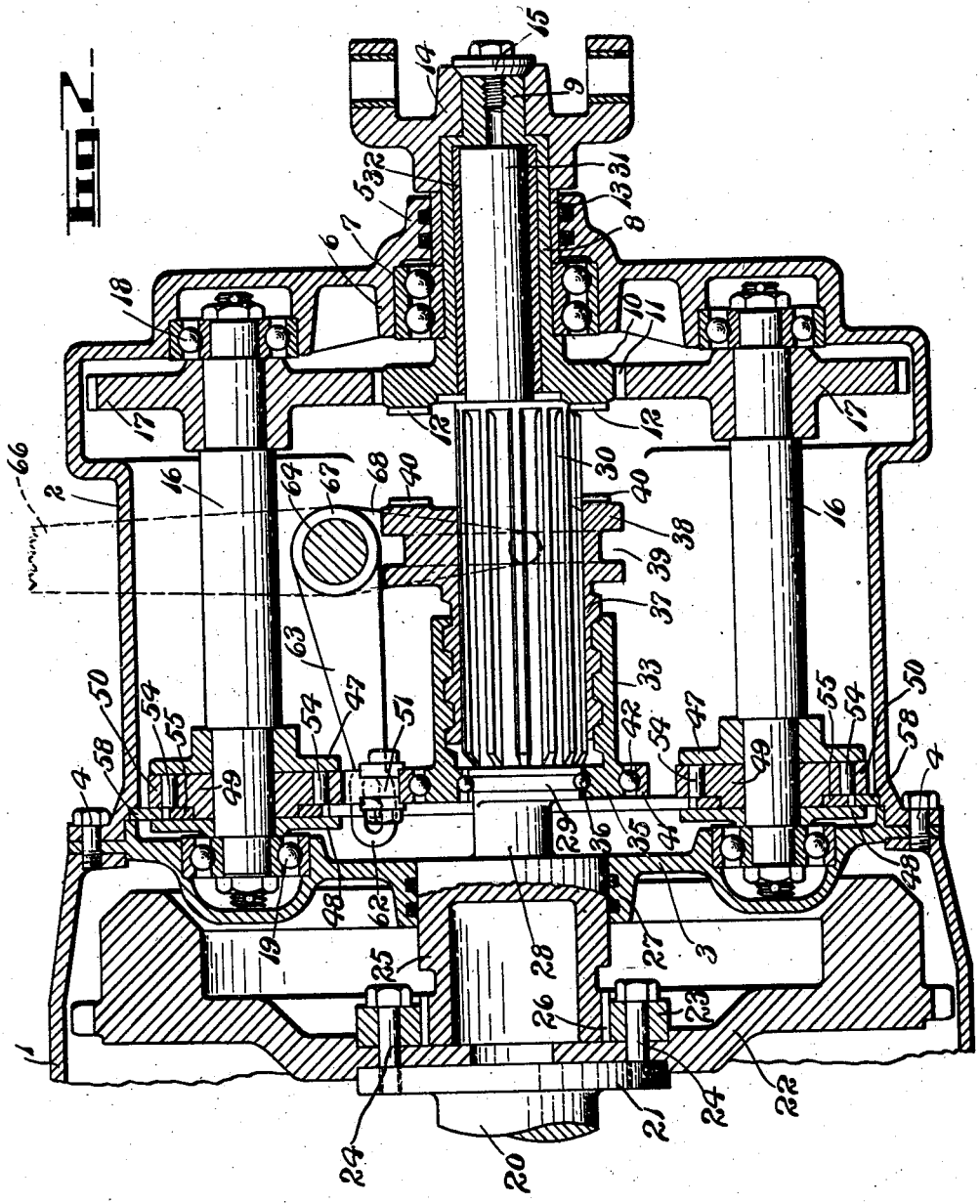

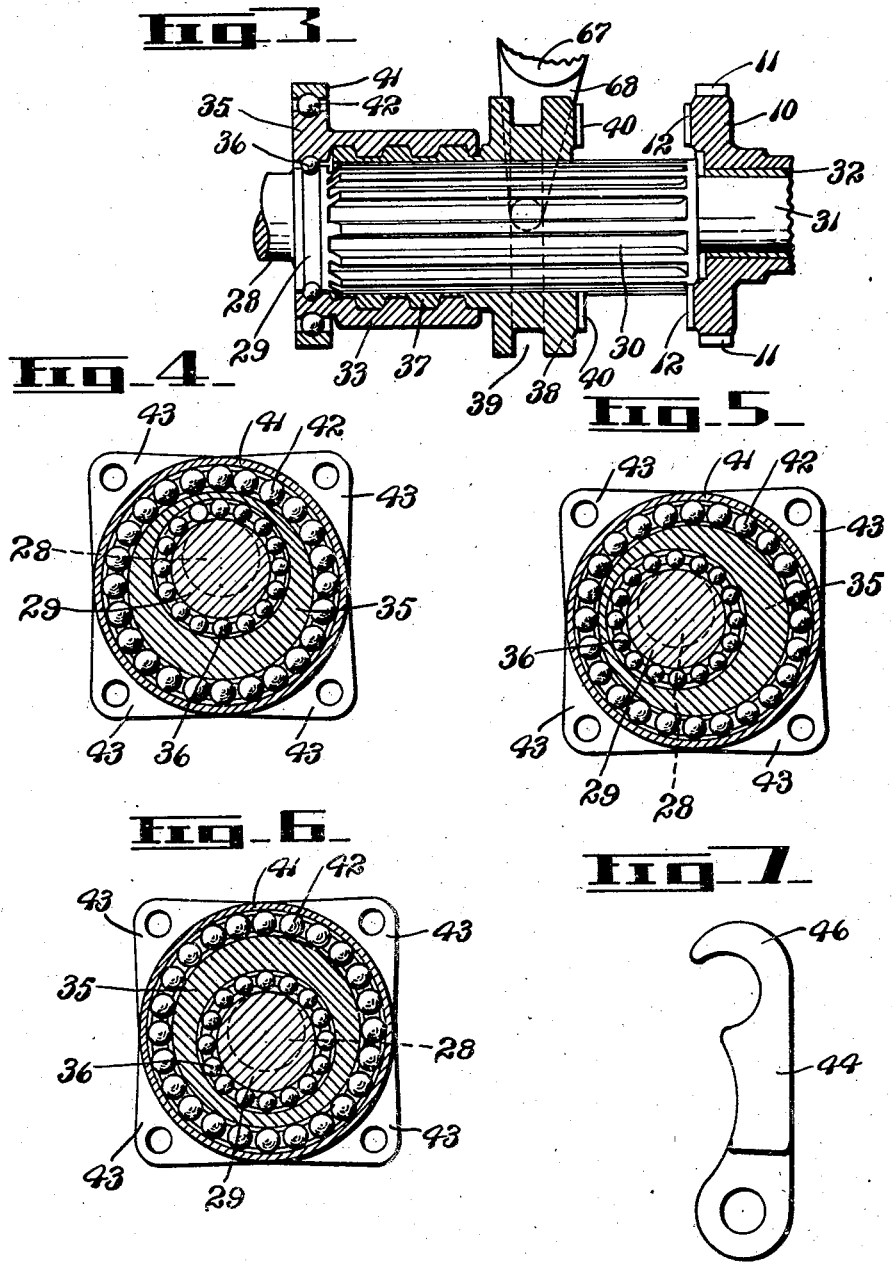

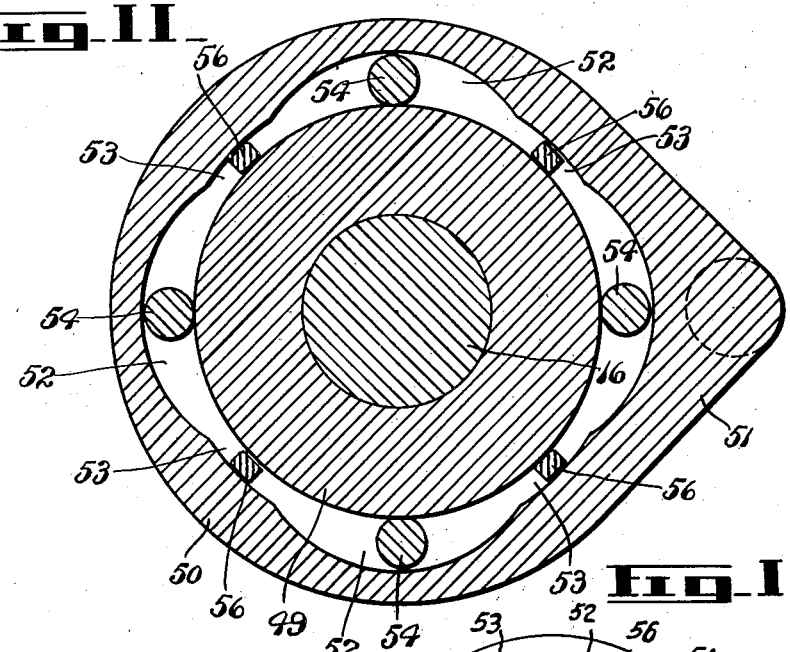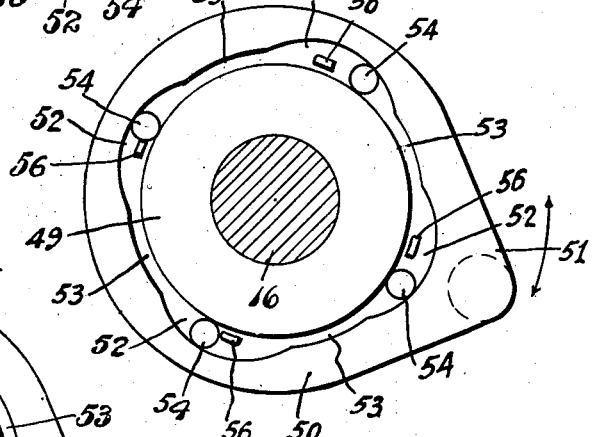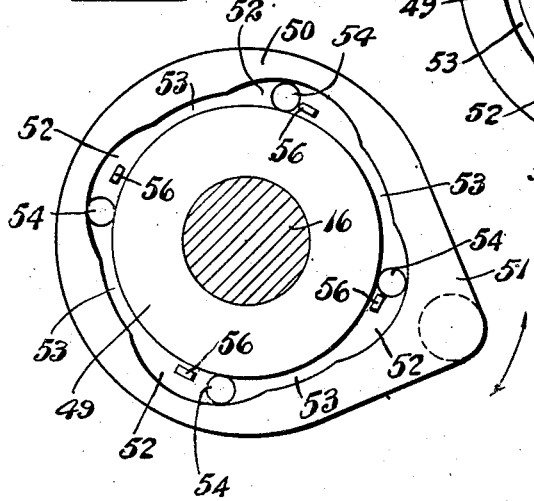

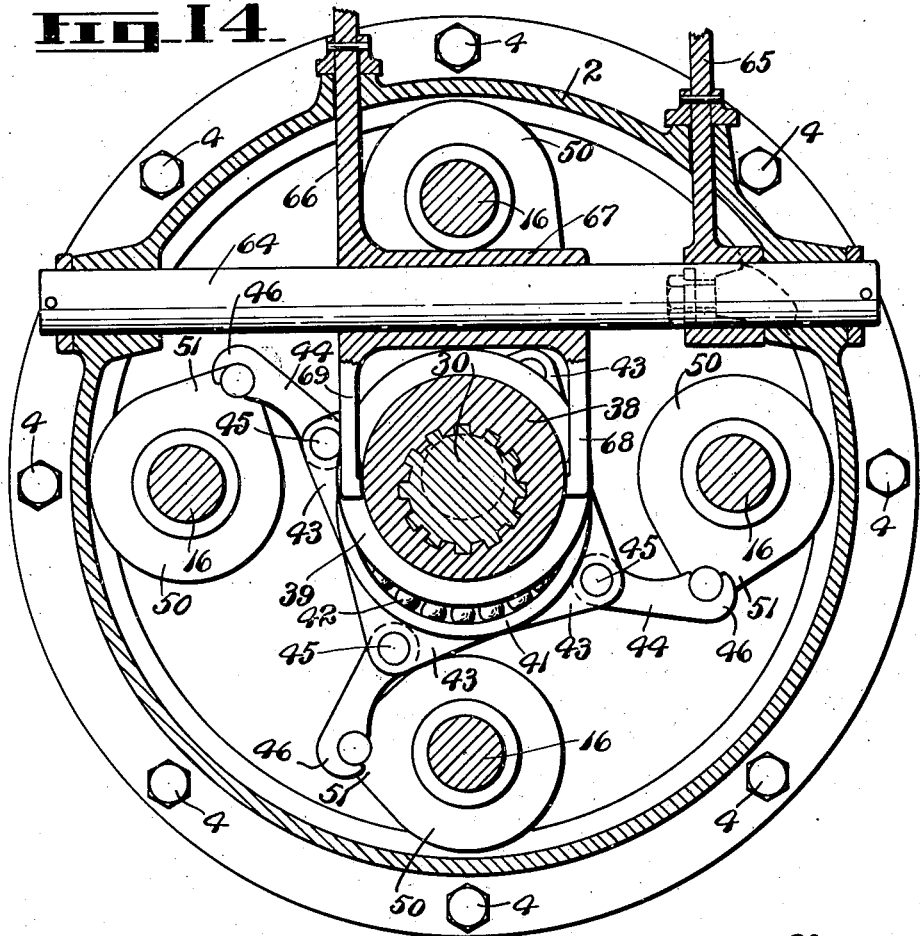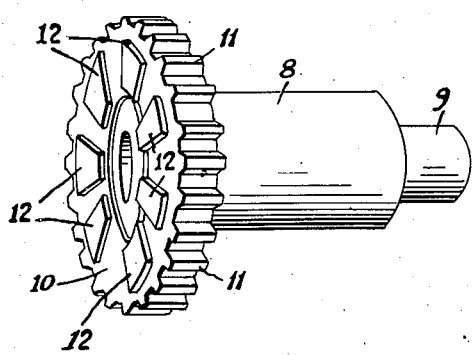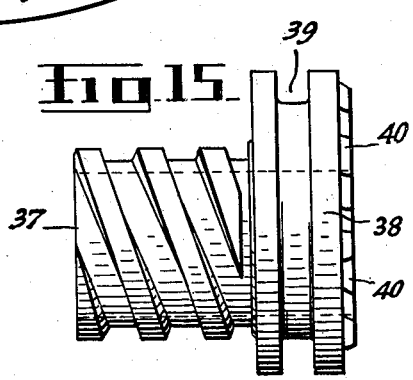

Aug. 18, 1936.　　　　C. W. DAKE　　　　2,051,783
VARIABLE SPEED POWER TRANSMITTING MECHANISM
Filed Aug. 16, 1934　　　7 Sheets-Sheet 7

INVENTOR
Charles W. Dake
BY
ATTORNEYS

Patented Aug. 18, 1936

2,051,783

UNITED STATES PATENT OFFICE 2,051,783

VARIABLE SPEED POWER TRANSMITTING MECHANISM

Charles W. Dake, Grand Haven, Mich.

Application August 16, 1934, Serial No. 740,054

8 Claims. (Cl. 74—117)

This invention relates to a variable speed power transmitting mechanism of a type which is interposed between a driving and a driven shaft so that the driven shaft may be driven at a variable speed with reference to a fixed speed of the driving shaft, or may be directly connected therewith so as to drive at the same speed as the driving shaft. Such power transmitting mechanisms are adapted to be interposed between the crank shaft of an engine and the propeller shaft of a motor vehicle though not in any sense restricted to the one place of use.

It is a primary object and purpose of the present invention to provide a compact and practical mechanism of the type noted, by means of which a greater number of speeds for the driven shaft may be attained than heretofore. A further object of the invention is to provide the mechanism with a means whereby it may drive the driven shaft in a reverse direction and at a large number of speeds and at all of the speeds except the direct driving connection between the driving and driven shafts, whereby a very great control reverse speed may be obtained. A still further object is to drive the driven shaft at a very low speed with respect to the driving shaft and lower than is possible with the usual gear transmission. And a still further object of the invention is to eliminate slide gears and also eliminate the usual clutch which is normally interposed between the engine crank shaft and the transmission mechanism.

These and many other objects and purposes will be apparent and the construction for attaining the same understood from the following description, taken in connection with the accompanying drawings, in which, Fig. 1 is a vertical longitudinal section, with the parts in a position for direct drive between the driving shaft and the driven shaft.

Fig. 2 is a similar section showing the parts in the position for a low speed transmission.

Fig. 3 is a fragmentary sectional view illustrating the position of the parts at which the driving shaft may operate but will transmit no speed to the driven shaft.

Fig. 4 is a fragmentary transverse section substantially on the plane of line 4—4 of Fig. 1, with the cooperating eccentrics in a position for an intermediate transmission of driving speed from the driving to the driven shaft.

Fig. 5 is a like view with the parts changed to give a greater speed of driving.

Fig. 6 is a like sectional view showing the neutral position of the eccentric members with no transmission from the driving to the driven shaft.

Fig. 7 is an elevation of a detail of one of the clutch driving links.

Fig. 8 is a transverse sectional view, showing the arrangement of the clutches and the driving connections therefor, the section being substantially on the plane of line 8—8 of Fig. 1, looking forward as indicated by the arrow.

Fig. 9 is a fragmentary sectional view on the plane of line 9—9 of Fig. 1 looking forward.

Fig. 10 is a fragmentary sectional view illustrating a detail of the clutch reversing mechanism.

Fig. 11 is a transverse section through one of the clutch members.

Fig. 12 is a view illustrating the clutch member adjusted for forward driving.

Fig. 13 is a similar view of one of the clutches adjusted for reverse driving.

Fig. 14 is a transverse vertical section substantially on the broken line 14—14 of Fig. 1.

Fig. 15 is a side elevation of the change speed sleeve and direct speed clutch element.

Fig. 16 is a perspective view of the direct driving clutch gear and sleeve.

Like reference characters refer to like parts in the different figures of the drawings.

Figure 17:
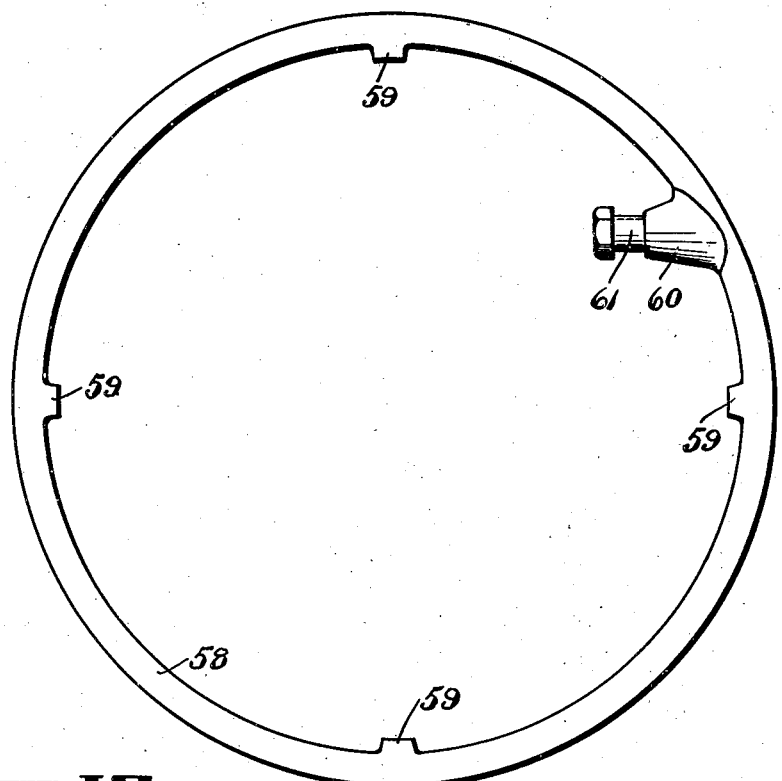
Fig. 17 is an elevation of the clutch control ring.
Figure 18:
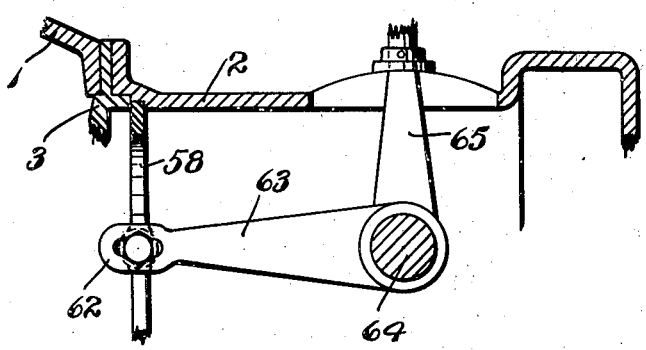
Fig. 18 is a fragmentary sectional view showing the means for manually operating the clutch control ring.

In Figs. 1 and 2, the rear portion of the engine housing is indicated at 1 to which the transmission housing 2 is secured, there being interposed between the adjacent ends of the two housings a substantially vertical plate or web 3, suitable connecting bolts 4 securing the parts together. The transmission housing at its rear end portion is substantially closed but has a central boss 5 with an opening therethrough. At the inner side of the rear end of housing 2 a bearing housing 6 is provided within which a roller bearing 7 is mounted.

A driven shaft comprising a substantially hollow sleeve 8 closed at its rear end and having a stub portion 9 projecting therefrom is inserted through the roller bearing 7. At its front end it is equipped with a disk 10 around the periphery of which is a plurality of gear teeth 11. On the front face of the disk 10 are a plurality of projecting clutch lugs 12 (Fig. 16) radially disposed and properly spaced apart as shown. A short filler sleeve 13 surrounds the shaft 8 and is located within the boss 5, which carries suitable packing so as to preclude the escape of lubricant from the transmission housing to the rear. One member 14 of a universal joint is fitted over the rear end of the shaft 8 and the stub 9 thereon and is secured in place, as by means of the washer and screw 15 as shown. It is to be understood that the other part of a universal joint connection may be connected to the part 14 and with a propeller shaft attached to said other part of the universal joint (not shown) the usual connection between a transmission and a motor vehicle propeller shaft is provided.

A plurality of shafts 16, four being shown in the drawings, are mounted at equally spaced distances around the longitudinal axis of the housing 2 and spaced therefrom, each adjacent to its rear having a fixed gear 17 meshing with the gear teeth 11 on the disk 10. The shafts 16 are mounted at their rear ends in suitable ball bearings 18 and at their front ends in similar bearings 19. The rear bearings are carried by the rear side of the housing 2 and the front bearings on the web 3.

The rear end portion of the driving shaft 20, which may be the rear end of the crank shaft of an internal combustion engine, has a disk 21 of greater diameter integral therewith, which is seated in a suitable annular recess in the front side of a flywheel 22. A ring 23 likewise is seated in an annular recess at the rear side of the flywheel. The inner annular curved side of the ring 23 is formed with a plurality of spaced apart teeth separated by grooves. This ring, the flywheel and the flange 21 are bolted together by means of bolts 24 as shown.

A main shaft extends rearwardly from and in alinement with the rear end of the crank shaft through the transmission housing. The forward portion 25 of said shaft at its front end is provided with a series of teeth or ribs separated by grooves so that the same may fit into the teeth or ribs on the ring 23, as at 26, providing in effect the same as an integral connection so far as operation of the parts is concerned, but being separable for purposes of installation and assembly or disassembly of the parts. The enlarged portion 25 passes through a suitable bearing 27 in the web 23, with packing between the shaft and the bearing so that lubricant does not escape from the transmission housing.

Back of the forward enlarged portion 25, the shaft is materially reduced in diameter providing a short section 28, at the rear end of which is formed an ecentric 29 having a continuous peripheral ball race therein. From such eccentric the shaft is extended rearwardly, as indicated at 30 likewise eccentrically with respect to the axis of rotation of the shaft. The part 30 is longitudinally splined around it with a large number of projecting longitudinal ribs separated by grooves as illustrated. The shaft terminates at its rear end in a section 31 having substantially the same diameter as the part 28, the axis of which is coincident wtih the axis of rotation of the entire shaft. The part 31 is received within a sleeve 32 which in turn is received within the hollow shaft 8.

A sleeve 33, which is ineriorly helically threaded, as shown at 34, at its forward end is provided with an eccentric head 35 located around the ecentric 29 and with a cooperating ball race therein. Between the two eccentrics 29 and 35 a plurality of balls 36 are located in the races. The sleeve 33 extends rearwardly over and for a part of the length of the splined section 30 of the previously described shaft.

A second sleeve 37 is interiorly grooved and splined to cooperate with the longitudinal splines on the section 30 whereby it may move lengthwise thereof. At its outer surface it is helically threaded to engage with the interior helical threading 34 of the sleeve 33. At its rear end it has an eccentric head 38 with a continuous groove 39 therein. The longitudinal center lines of the sleeves 33, 37, of eccentric 29 and of the splined section 30 of the shaft are coincident while the center line of the eccentric portion 38 is coincident with the longitudinal axis of rotation of the main shaft consisting of the various sections 25, 28, 31. At the rear face of the head 38 a plurality of spaced apart clutch lugs or bosses 40 are provided, radially disposed and of a shape such as to be received in the recesses between the cooperating clutch projections or bosses 12 on the disc 11.

A ring 41 surrounds the head 35. The inner peripheral surface of the ring and the outer peripheral surface of the head 35 are provided with cooperating ball races for the reception of a plurality of balls 42 therein as shown. From the ring 41 a plurality of spaced apart lugs 43 extend outwardly, spaced equally around the ring, there being one for each of the shafts 16 (Fig. 14). A link 44 is pivotally connected at one end at 45 to each of the projections 43, each of said links at its outer end being of a hooked form, as indicated at 46, for a purpose as will hereafter appear.

Near the left hand ends of the shafts 16, (Figs. 1 and 2), two spaced apart retaining plates 47 and 48 are secured between which and fixed to the shaft is a rotor 49 forming one part of a rotary clutch. Surrounding each of the parts 49 is a cooperating clutch member 50 of cylindrical form except at one side it is provided with an outwardly extending projection 51. A hook 46 of a link 44 connects with a lateral pin extending from the projection 51 as shown in Figs. 8 and 14, there being a link for each of the clutch members 50. Between the inner clutch member 49 and the outer clutch member 50 is a continuous space of irregular form, best shown in Figs. 11 to 13 inclusive. At equally spaced distances, 90 degrees apart, are somewhat enlarged spaces 52 which are connected by connecting spaces 53, the latter of which have sides concentric with the axis of the shaft 16, while the spaces or recesses 52 increase progressively in width from each end where joining the contiguous spaces 53 to the point midway between in a smooth curve as fully shown in Figs. 11 to 13 inclusive. A roller 54 is located in each of the enlarged spaces 52 between the clutch members.

The rotor or inner clutch member 49 is reduced in diameter at one end and around this reduced portion and bearing against the adjacent retaining member 48 is a ring 55 radially projecting from which (Fig. 10) are two projections 57. Longitudinally projecting from the ring 55 at equally spaced distances are fingers 56 which are adapted to enter the space between the clutch members 49 and 50. An operating ring 58 (Figs. 10 and 17) is mounted for rotation around the inner side and at the front end of the housing 2, in a suitable recess in said housing and between the housing and the web 3, having four equally spaced inward projections 59, so that one of said projections 59 comes between the projections 57 on each of the rings 55. By rocking the ring 58, that is turning it about its center, the projections 59 may engage with one of the projections 57 on each ring 55 dependent upon the direction of movement, thus turning all of the rings 55 simultaneously and simultaneously changing the position of the fingers 56. In Fig. 11 the fingers 56 are shown at intermediate positions. In Figs. 12 and 13 they have been moved to the two extremes, to either side of such intermediate positions.

A boss 60 is welded or otherwise secured at one point at the inner edge of the ring 58 and has a pin projecting therefrom covered by sleeve 61. This pin with the sleeve thereover enters the slotted end 62 of an arm 63, secured to a rock shaft 64 (Figs. 1, 2 and 14), which is mounted for rocking movement on and extends across the housing 2. A hand lever 65 is secured to the shaft and may be integral with arm 63, and extends upwardly through a suitable slot in the upper side of the housing 2. With the hand lever 65 in vertical position the fingers 56 are neutral as in Fig. 11. Moving the lever forward to its extreme position or backward to its extreme rear position shifts the fingers to their extreme positions of movement as shown in Figs. 12 and 13.

A second lever 66 passes upwardly through a suitable slot in the housing 2, being connected integrally to a sleeve 67, mounted for free movement on the shaft 64 and from the ends of which yoke arms 68 extend downwardly to enter the groove 39 in the head 38 at opposite sides thereof. (Fig. 14.)

Operation

Movement of the lever 66 moves the sleeve 37 lengthwise along the splined section 30. At the same time such movement lengthwise of the splined shaft 30 causes the helix on the sleeve 37 to move into the helical grooves 34 on the interior of the sleeve 33, thereby turning the sleeve 33 and thus changing the relative position of the two eccentrics 29 and 35. When the parts have been moved to the position shown in Fig. 3 there is no transmission of driving force from the crank shaft 20 to the shaft 8. This is for the reason that the axes of rotation of the shaft 20 and of the main shaft of the transmission coincide with the center about which the balls 42 turn and the eccentrics 29 and 35 rotate about such axis, whereupon the ring 41 and the parts connected thereto are at rest. Such position of the eccentrics is illustrated in Fig. 6 and is the position of the parts when the adjustment has been made as indicated in Fig. 3. With a shifting of the sleeve 37 rearwardly the eccentrics are changed in position relative to each other and there occurs an in and out movement of the ring 41 and the attached lugs 43 in a plane perpendicular to the longitudinal axis of shaft 20 and of the main shaft of the transmission. The greater the throw of the eccentrics with respect to each other, the greater is this movement of the ring 41 and the connecting lugs 43, so that at the position shown in Fig. 1 there is the greatest throw of such parts with a corresponding greater reciprocating movement of the links 44.

The reciprocating movement of the links 44 is transmitted to the clutch members 50 which are rocked back and forth about the interior clutch member 49. With the fingers 56 in the position shown in Fig. 12, the movement of the clutch members 50 in a clockwise direction, as indicated by the arrow, causes some of the rollers 54 to gravitate downwardly and wedge between the inner clutch members 49 and the outer faces of the recessed portions 52, thus imparting a movement to the shaft 16 in a clockwise direction. (Fig. 12.) On the return movement of the outer clutch member 50, that is, its movement in a counterclockwise direction, the rollers which were engaged are disengaged from wedging position and the remaining rollers are prevented from engagement by the fingers 56 thus preventing return movement of the rotors 49. Therefore, each of the shafts 16 is moved in a single direction of movement through intermittent or periodic connection of the outer driving clutch members 50 to the inner clutch members 49.

The greater the throw of the eccentrics the greater is the impulse given to the shaft and the greater the rotation of shafts 16. Therefore, starting from no rotation whatsoever of the shafts 16, the rotation may progressively increase from zero up to its maximum or just before the sleeve 37 reaches the position shown in Fig. 1, that is just before the disc clutch members 40 and 12 engage with each other. Gears 17 thus drive the shaft 8.

When such engagement of the clutch parts 40 and 12 occurs there is a direct drive from the crank shaft 20 to the driven shaft 8. The shafts 16 are then driven through the gears 17 and the rotors or inner clutch members 49 turn freely in a direction such that the rollers 54 are disengaged from and do not wedge against the outer clutch member 50.

There is provided, with the transmission which has been described, a free rotation of the engine crank shaft 20 and of the main shaft of the transmission without imparting any rotative movement to the driven shaft 8 or to the propeller shaft connected therewith by means of the universal joint connection described. With the transmission accordingly there is no need of a foot operated clutch to disengage the engine crank shaft from the transmission. It is merely necessary to operate the lever 66 to its extreme rear position thereby moving the sleeve 37 to its extreme forward position. Then with a continual progressive movement of the lever 66 from its extreme forward position to its extreme rear position there is a transmission of driving from the driving shaft 20 to the driven shaft 8, beginning with a very low speed of rotation of the shaft 8 and a progressive increasing speed up to the point where the direct drive is about to take place. A still further movement of the lever 66 engages the direct driving means of the clutch members 50 and 12 after which there is direct drive.

The reverse is accomplished by operating the lever 65 so as to shift the fingers 56 to come at opposite sides of the rollers 54, whereupon the drive of the rotors 49 on the shaft 16 takes place on the counterclockwise movement of the outer clutch members 50 and not on the clockwise movement. The rollers 54 wedge between the clutch members 49 and 50 on such counterclockwise movement, as shown in Fig. 12, directly opposite from that shown in Fig. 13, and turn the inner clutch members 49 and the shaft 16 to which they are attached in a reverse direction. The lever 66 then may be operated the same as before except that when the lever 65 has been moved to a position so that reverse driving is accomplished, the lever 66 must not be moved to the extreme position such that the lugs 40 and 12 will engage as in direct driving. The mechanism for accomplishing this is not illustrated in the present application but is to be the subject matter of a further and later application.

It is therefore evident that for reverse driving there can be many relative speeds of driving between the driving and the driven shaft the same as for the forward drive. The only difference is that for reverse driving there is no direct reverse drive between the crank shaft and the driven shaft. Such direct drive is neither necessary nor desirable.

With the construction described, there is accomplished the several objects of the invention recited in a practical, simple and efficient manner. The clutch and the clutch pedal is eliminated, much lower speed is possible than with slide gear transmissions and there is no gear clash. While the helical threading on the sleeve 37 and the interior corresponding helical threading on the sleeve 33 are shown with a relatively step pitch, in practice the pitch may be considerably less than illustrated and the sleeves 33 and 37 and the meshing splined section 30 of the main shaft of the transmission, and other parts to correspond elongated over what is shown in Figs. 1 and 2, which are shown shortened in the drawings on account of lack of space.

The invention is defined in the appended claims and is to be considered comprehensive of all forms of structure coming within their scope.

I claim:

1. In combination, a driving shaft, a driven shaft, said driving shaft having an eccentric thereon and then terminating in a ribbed portion adjacent thereto, an eccentric head revolubly mounted upon said eccentric portion and having a sleeve extending axially over the ribbed portion, a second sleeve mounted upon the said ribs and means cooperatively associated with the first sleeve whereby movement between the sleeves causes rotating movement of the eccentric head relative to the eccentric, a ring revolubly mounted upon and surrounding the eccentric, links connected at spaced apart points on the ring and extending substantially radially therefrom and connected to the hereinafter mentioned gripping clutches, a plurality of shafts revolubly mounted in spaced relation from the driving and driven shafts, reversible gripping clutches mounted upon each of said shafts, means for connecting each of the shafts to the driven shaft and means for rendering the reversible gripping clutch operative in either direction.

2. A combination of elements as set forth in claim 1 in which said last mentioned means includes a large ring revolubly mounted and encircling the axes of the driving and driven shafts, for the purpose described.

3. In a power transmitting mechanism of the class described, a driving shaft, a driven shaft, said driven shaft including an axial recess therein which receives one end of the driving shaft, said driven shaft being enlarged to receive a disk with teeth thereon and having axially extending clutch teeth, a sleeve slidably but non-rotatably mounted upon the driving shaft, said sleeve having complementary clutch teeth which are adapted to engage with the previously mentioned clutch teeth when the sleeve is in one of its several positions, a plurality of shafts arranged concentrically about the driving and driven shafts, gears on each of said last mentioned shafts and meshing with the teeth on the previously mentioned disk, an eccentric formed on the driving shaft, an eccentric head revolubly mounted upon the eccentric, a sleeve integrally formed with the eccentric head, means cooperatively associated with the sleeves whereby movement of the said first mentioned sleeve varies the eccentricity of the eccentric head, a ring mounted upon the eccentric head and gyrated thereby, links pivotally connected to said ring and extending outwardly therefrom and gripping clutch mechanism cooperatively associated with each of said links and mounted upon the several shafts for the purpose described.

4. A combination of elements as set forth in claim 3 in which the first mentioned sleeve has a groove formed therein, this groove being in concentric relation to the driving and driven shafts, for the purpose described.

5. A variable speed power transmitting mechanism of the type herein described comprising a driving shaft, a driven shaft, the said driving shaft having an extended bearing portion and a splined portion, the said splined portion being eccentric with the axis of the driven shaft, an internally longitudinally grooved sleeve encircling the splined portion of the driving shaft and having a plurality of helical teeth at its periphery, a second sleeve encircling the first mentioned sleeve and having internal helical teeth engaging the external helical teeth of the said first mentioned sleeve and a portion eccentric with its axis, a ring surrounding the said eccentric portion of the second sleeve, a plurality of shafts in spaced relation around the axis of the driving and driven shaft, an intermittent driving clutch on each shaft, the said intermittent driving clutches each including a drum secured to a shaft, an encircling band having a plurality of inclined pockets, clutch rollers in the inclined pockets and a projection whereby the encircling band is connected to the ring surrounding the last mentioned eccentric by connecting links whereby an oscillatory movement is imparted to the encircling band, a gear secured to each of the shafts carrying the relatively spaced intermittent driving clutches, a driven gear located on the driven shaft and driven by the gears of the spaced clutch shafts.

6. A variable speed power transmitting mechanism of the type herein described comprising an engine driving shaft, the said driving shaft having an extended bearing portion and a splined portion, the said splined portion being eccentric with the axis of the driving shaft, an internally longitudinally grooved sleeve encircling the splined portion of the driving shaft and having a plurality of helical teeth at its periphery, a clutch and a means whereby it may be moved longitudinally of the driving shaft and a second sleeve encircling the first mentioned sleeve and having internal helical teeth engaging the external helical teeth of the said first mentioned sleeve and a portion eccentric with its axis, a ring surrounding the said eccentric portion of the second sleeve, a plurality of intermittent driving clutches in spaced relation around the axis of the driving and driven shaft, the said intermittent driving clutches consisting in part of a drum secured to a shaft, an encircling band having a plurality of incline pockets, clutch rollers in the incline pockets and a projection whereby the encircling band is connected to the ring surrounding the last mentioned eccentric by connecting links whereby an oscillatory movement is imparted to the encircling band, a gear secured to each of the shafts carrying the relatively spaced intermittent driving clutches, a driven shaft driven by the gears of the spaced clutch shafts at a lower speed than that of the first mentioned driving shaft and means whereby the last mentioned driven shaft is engaged to be driven by the clutch at the speed of the driving shaft whereby the intermittent driving clutches can be caused to be inoperative.

7. A variable speed power transmitting mechanism of the type described comprising a driving shaft, a driven shaft and means for connecting the driving shaft to the driven shaft, said means including a stub shaft rigidly attached to the driving shaft, said stub shaft having an eccentric thereon and an eccentric head portion encircling said eccentric and adjustable circumferentially with respect thereto, a ring surrounding the eccentric head portion and revolubly mounted thereon, a plurality of shafts located in spaced relation about the axes of the driving and driven shafts, roller clutch means located on each of said shafts, links extending between each set of roller clutch means and the ring, a gear on the driven shaft, and gears, one on each of the concentrically spaced shafts, meshing with said gear on the driven shaft for the purpose described, and means slidably mounted upon the eccentric and cooperatively associated with the eccentric head whereby the same is adjustable.

8. A variable speed power transmitting mechanism of the type described comprising a driving shaft, a driven shaft and means for connecting the driving shaft to the driven shaft, said means including a stub shaft rigidly attached to the driving shaft, said stub shaft having an eccentric thereon and an eccentric head portion encircling said eccentric and adjustable circumferentially with respect thereto, a ring surrounding the eccentric head portion and revolubly mounted thereon, a plurality of shafts located in spaced relation about the axes of the driving and driven shafts, roller clutch means located on each of said shafts, links extending between each set of roller clutch means and the ring, a gear on the driven shaft, and gears, one on each of the concentrically spaced shafts, meshing with said gear on the driven shaft for the purpose described, said eccentric having a ribbed portion extending therefrom, a sleeve mounted on said ribbed portion for sliding movement, threads formed exteriorly of said sliding sleeve, a second sleeve rigidly attached to the eccentric head and extending therefrom over the first mentioned sleeve and having engagement therewith, and means for moving these sleeves relatively to one another, whereby circumferential adjustment of the eccentric head is had.

CHARLES W. DAKE.